United States Patent [19]

Cottrell

[11] Patent Number: 5,551,773
[45] Date of Patent: Sep. 3, 1996

[54] UNIVERSAL MOBILE WORKBENCH

[76] Inventor: Rickey E. Cottrell, 317 Bonnahurst Dr., Hermitage, Tenn. 37076

[21] Appl. No.: 296,460

[22] Filed: Aug. 26, 1994

[51] Int. Cl.⁶ .................................................. A47B 96/00
[52] U.S. Cl. .................................. 312/249.8; 312/249.1; 242/129; 242/403.1; 242/533.8; 242/598.5
[58] Field of Search .................................. 312/249.8, 237, 312/249.1, 329, 351.13; 242/129, 129.7, 403, 403.1, 533.8, 557, 598.5

[56] References Cited

U.S. PATENT DOCUMENTS

| | | | |
|---|---|---|---|
| D. 283,171 | 3/1986 | Smith et al. | D34/21 |
| D. 337,404 | 7/1993 | Miles | D34/19 |
| 3,861,766 | 1/1975 | Corsini et al. | 312/125 X |
| 4,457,527 | 7/1984 | Lowery | 242/557 X |
| 4,518,208 | 5/1985 | Mander | 312/209 X |
| 4,652,062 | 3/1987 | Greenwood | 312/249.8 X |
| 4,786,122 | 11/1988 | Nichoalds | 312/257.1 X |
| 4,998,742 | 3/1991 | Maynard | 280/35 |
| 5,282,678 | 2/1994 | Teufel et al. | 312/249.8 X |
| 5,285,981 | 2/1994 | Pavelka | 242/86.5 |
| 5,286,103 | 2/1994 | Price, Jr. et al. | 312/249.8 X |
| 5,308,012 | 5/1994 | Fuller | 242/557 X |

*Primary Examiner*—Brian K. Green
*Assistant Examiner*—James Orville Hansen
*Attorney, Agent, or Firm*—Henry S. Miller; Rhodes & Ascolillo

[57] ABSTRACT

A mobile work bench including a top with a lip for preventing parts from rolling off and as a gripping surface to move the bench. A container under the top for storing parts and tools, a hinged door provides access to the area. A recessed area at one end and under the top, recessed and provided with supports for holding wire spools. The workbench has four wheels with brakes, two wheels on one end swivel for ease and convenience of movement.

7 Claims, 2 Drawing Sheets

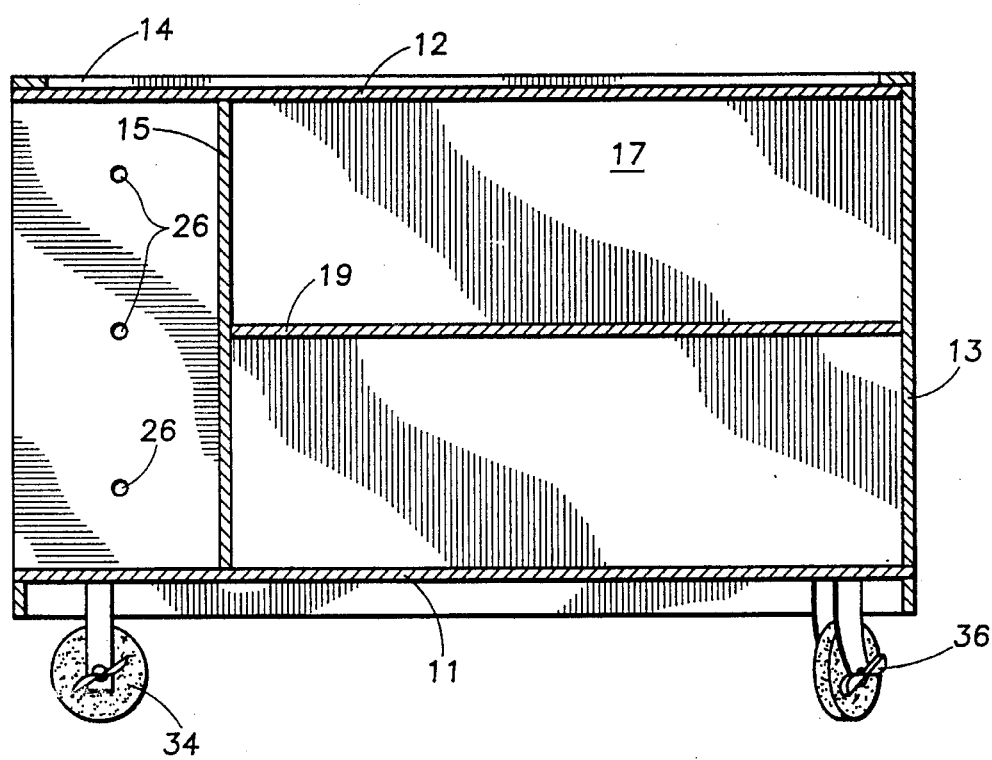
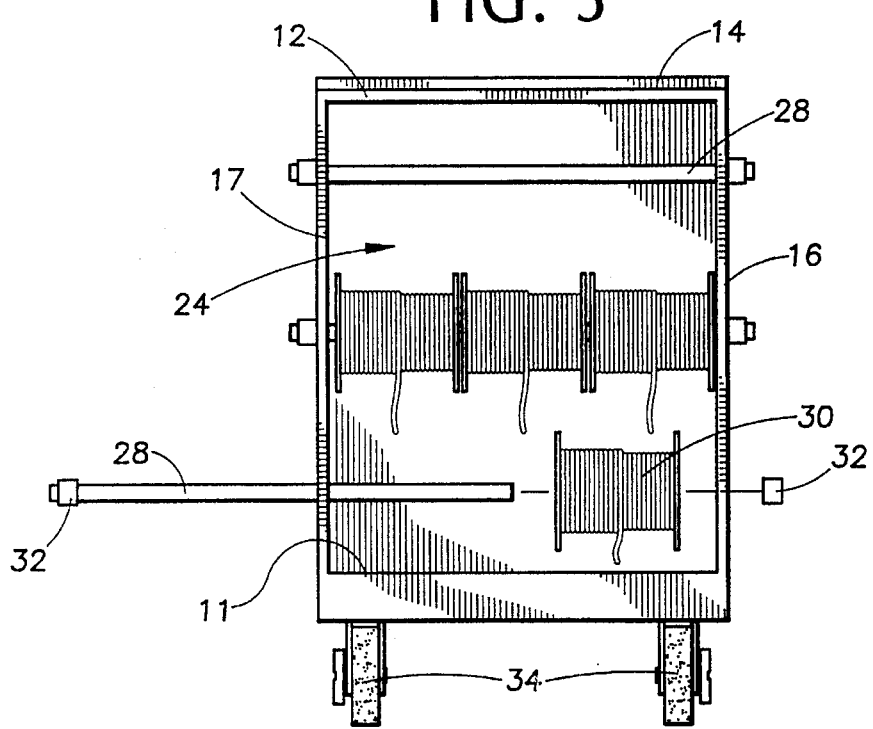

UNIVERSAL MOBILE WORKBENCH

BACKGROUND OF THE INVENTION

1. Field of the Invention

This invention relates generally to mobil workbenches and more particularly to a universal workbench that is compatible for use in all well known trades.

2. Description of the Prior Art

The mobil workbench is a common sight in industrial complexes where facilities tend to be spread out over a large area and in particular where it is inconvenient or impossible to approach a work site with a motor vehicle. Craftsmen move their tools and equipment on and in a workbench particular to the specific trade and as a result at one work site there may be as many as four or five different work benches carrying predominately duplicate equipment. A universal workbench would allow all the needed equipment to carried on a single cart thus eliminating unnecessary congestion around the work site.

Prior art of which Applicant is aware and wishes to be made of record include a number of U.S. Patents as listed and described herein. U.S. Pat. No. Des. 283,171 issued Mar. 25, 1986 to Smith et al. shows a cart for holding rolls of wire including swiveling and non swiveling castors, a handle for moving the cart on the end that swivels and supports for pipes or rods that presumably will pass through the center of wire spools. U.S. Pat. No. 4,998,742 issued Mar. 12, 1991 to Maynard for a portable workbench cart that includes a frame and a hinged top that forms one level of a two level structure. Wheels that swivel on one end and that end also including a handle to pull-push the cart. Another mobile workbench is shown in U.S. Pat. No. Des. 337,404 issued Jul. 13, 1993 to Miles. The bench appears to have an over size table top with drawers stacked on the side and one end. It also appears that all four corner mounted castors swivel. A wire dispenser is disclosed in U.S. Pat. No. 5,285,981 issued Feb. 15, 1994 to Pavelka includes a number of arms for supporting spools of wire on a frame with wheels and a handle and resembling a golf cart. Also supplied are two sheets of what appears to be catalog information from an unidentified and undated source showing storage cabinets including those with drawers and doors and lips along three edges to keep parts from rolling off the top surface. Included on one sheet is a description of a commercially available wire cart, similar to the well known hand cart but with pipes or bars to support wire spools within the frame.

The prior art fails to show, and Applicant is unaware of any mobile workbench that combines the features of the various types and styles of craftsmen benches into a single universal bench that is useable by all the trades.

SUMMARY OF THE INVENTION

The invention is directed to a unique combination of service cart, wire cart, gang box and print table brought together in one unit. The workbench is constructed of steel and is approximately 48 inches in width and 24 inches deep. The top surface height is approximately 33 inches including the height of the casters for moving the workbench. The top surface includes a three-quarter inch lip which prevents small parts from rolling off and also serves as a grip when moving the bench. A door located in the front side of the bench allows access to the storage compartment which contains at least one shelf and tool storage equipment. The door is hinged and hasped and equipped to be locked when not in use. One end of the workbench contains a recessed area. The walls of the recessed area contains a number of opposed throughgoing holes that are adapted to accept steel pipe or rods and are so spaced from the wall of the bench and each other so that they will accept wire spools for storage and dispensing wire. The pipe or rods are secured by means of cotter pins or other suitable means. Casters under each corner of the bench allow it to be easily moved from place to place and the use of locking casters secure it in place. For convenience, the casters on one end of the bench swivel making it easier to maneuver in close areas.

It therefore an object of the invention to provide a new and improved universal workbench.

It is another object of the invention to provide a new and improved work bench which has all the advantages of prior art workbenches and none of the disadvantages.

It is still another object of the invention to provide a new and improved work bench low in initial cost and easily maintained.

It is a further object of the invention to provide a new and improved work bench which may be easily and efficiently manufactured and marketed.

It is still a further object of the invention to provide a new and improved workbench which is of a durable and reliable construction.

It is another object of the invention to provide a new and improved-. workbench which is easy to move and maneuver to and through work sites.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a view of the invention taken along line 2—2 of FIG. 1.

FIG. 3 is an end view of the invention.

DESCRIPTION OF THE PREFERRED EMBODIMENT

Figure 1:
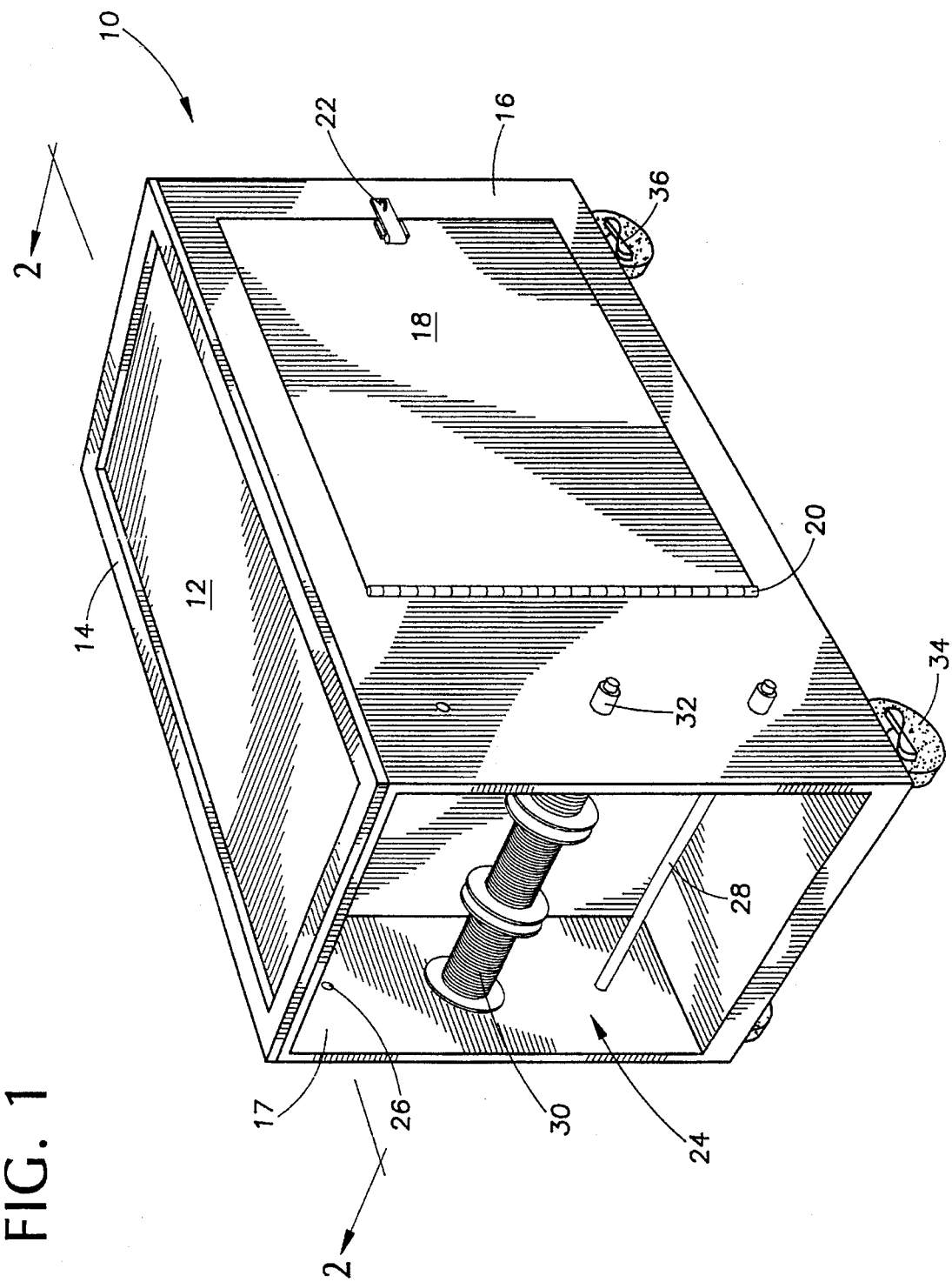
FIG. 1 is a perspective view of the invention.

Referring now to FIG. 1, the workbench and subject of the invention is shown generally at 10. The top panel 12 is a working surface and particularly adapted for viewing plans and blue prints. A lip 14 follows the perimeter of the top and is designed to prevent objects from falling off the top and, having a uniform height suitable for carrying and cutting electrical conduit. In addition, the lip gives the user a grip by which to move the bench from place to place. The front panel 16 contains a door 18 supported by a hinge 20 and secured by the hasp 22. A pad lock of conventional design will engage the hasp and lock the door thus securing the tools and equipment inside the compartment formed by the walls of the bench. An open compartment 24 is formed at the end of the bench by the walls 16 and 17 of the bench compartment. A series of holes 26 on opposed walls of the compartment accept metal pipe or rods 28 for supporting wire spools 30. The spool supports are restrained by cotter pins or like devices 32. Wheels 34 are fixed directionally, while wheels 36 are castered and swivel in 360 degrees. All wheels on the bench are provided with locking brakes to secure the bench from unwanted movement.

FIG. 2 is a section taken along line 2—2 of FIG. 1 and shows the interior of the cabinet under the top panel 12 including adjustable shelf 19. Hooks and other equipment storage means may be included in the cabinet within the meaning and intent of the invention.

Concerning FIG. 3, the open compartment 24 is formed of the extension of side panels 16 and 17 and top and bottom panels 12 and 11 respectively. Wire spools 30 are supported by members 28 passing through the side panels and held in place by the end stops 32.

Although tools and equipment may be locked in the closed compartment the wire is left out of the way but not in a secured condition.

It should be understood, of course, that the foregoing disclosure relates to only a preferred embodiment of the invention and that numerous modifications or alterations may be made therein without departing from the spirit and scope of the invention as set forth in the appended claims.

What is claimed is:

1. A mobile work bench comprising:

a structure having top, bottom, side and end panels joined forming a void;

an aperture in one side panel providing access to said void;

a door covering the aperture;

a lip mounted on the top panel and following a perimeter of said top panel;

a shelf adjustably positioned in the void and accessible from said aperture;

an area of recess between said panels, including the top, bottom, two sides and one end panel;

aperture means in said side panels in the area defined by the recess for receiving support means;

support means, formed in the shape of elongated cylinders extending through said aperture means and beyond on each end and within reinforcement end stops; said reinforcement end stops abutting said aperture means for securing the support means between said side panels.

2. A mobile workbench according to claim 1 including: a hinge means for connecting the door to the side panel.

3. A mobile workbench according to claim 1 including: a hasp means for securing the door in the closed position.

4. A mobile workbench according to claim 1 further including: wheels affixed to the bottom panel for moving the bench.

5. A mobile workbench according to claim 4 wherein: at least two wheels are swivel mounted.

6. A mobile workbench according to claim 5 wherein: at least two of said wheels include locking brakes.

7. A mobile workbench according to claim 6 including at least three support means.

\* \* \* \* \*